US012514826B2

(12) United States Patent
Funda et al.

(10) Patent No.: US 12,514,826 B2
(45) Date of Patent: Jan. 6, 2026

(54) DELIVERY SYSTEM FOR POLYUNSATURATED FATTY ACIDS

(71) Applicant: DSM IP ASSETS B.V., Heerlen (NL)

(72) Inventors: Elger Funda, Kaiseraugst (CH); Odile Krainz, Kaiseraugst (CH); Robert Steinert, Kaiseraugst (CH)

(73) Assignee: DSM IP Assets B.V. (NL)

( * ) Notice: Subject to any disclaimer, the term of this patent is extended or adjusted under 35 U.S.C. 154(b) by 846 days.

(21) Appl. No.: 17/603,163

(22) PCT Filed: Apr. 9, 2020

(86) PCT No.: PCT/EP2020/060164
§ 371 (c)(1),
(2) Date: Oct. 12, 2021

(87) PCT Pub. No.: WO2020/221573
PCT Pub. Date: Nov. 5, 2020

(65) Prior Publication Data
US 2022/0192998 A1 Jun. 23, 2022

(30) Foreign Application Priority Data
Apr. 30, 2019 (EP) ..................................... 19171756

(51) Int. Cl.
| | |
|---|---|
| *A61K 9/50* | (2006.01) |
| *A23K 40/30* | (2016.01) |
| *A23L 33/12* | (2016.01) |
| *A23P 10/30* | (2016.01) |
| *A23P 20/10* | (2016.01) |
| *A61K 9/28* | (2006.01) |
| *A61K 9/48* | (2006.01) |
| *A61K 31/20* | (2006.01) |
| *A61K 31/201* | (2006.01) |
| *A61K 31/202* | (2006.01) |
| *A61P 3/02* | (2006.01) |
| *B01J 13/14* | (2006.01) |
| *B01J 13/22* | (2006.01) |

(52) U.S. Cl.
CPC ............ *A61K 9/5073* (2013.01); *A23K 40/30* (2016.05); *A23L 33/12* (2016.08); *A23P 10/30* (2016.08); *A23P 20/10* (2016.08); *A23P 20/105* (2016.08); *A23P 20/11* (2016.08); *A61K 9/2886* (2013.01); *A61K 9/4816* (2013.01); *A61K 9/5015* (2013.01); *A61K 9/5026* (2013.01); *A61K 9/5036* (2013.01); *A61K 9/5063* (2013.01); *A61K 9/5089* (2013.01); *A61K 31/20* (2013.01); *A61K 31/201* (2013.01); *A61K 31/202* (2013.01); *A61P 3/02* (2018.01); *B01J 13/14* (2013.01); *B01J 13/22* (2013.01)

(58) Field of Classification Search
None
See application file for complete search history.

(56) References Cited

U.S. PATENT DOCUMENTS

| | | | |
|---|---|---|---|
| 6,234,464 | B1 | 5/2001 | Krumbholz et al. |
| 2010/0062057 | A1 | 3/2010 | Berge et al. |
| 2016/0158174 | A1 | 6/2016 | Hayashi et al. |

FOREIGN PATENT DOCUMENTS

| | | |
|---|---|---|
| CN | 106998779 | 8/2017 |
| WO | WO2016/094218 | 6/2016 |
| WO | 2019/008101 | 1/2019 |

OTHER PUBLICATIONS

General Kinematics ("Batch vs. Continuous Pharmaceutical Manufacturing", an internet article published on Oct. 11, 2017 and obtained from the website: https://www.generalkinematics.com/blog/batch-vs-continuous-pharmaceutical-manufacturing/ ) (Year: 2017).*
S. Jose, et al., "Colon Targeted Drug Delivery: Different Approaches", Journal of Young Pharmacists, vol. 1, No. 1, 2009, pp. 13-19.
International Search Report and Written Opinion of the ISA for PCT/EP2020/060164 dated Jun. 9, 2020, 12 pages.
The First Office Action, CN Application No. 202080031139.6, Aug. 12, 2022.
Notice of Reasons for Rejection, JP Patent Application No. P2021-556525, Oct. 31, 2023.
Messaoud, Ghazi Ben et al, "Physico-chemical properties of alginate/shellac aqueous-core capsules: Influence of membrane architecture on riboflavin release", *Carbohydrate Polymers*, 144 (2016) 428-437.
Zanjani, Mohammad A.K. et al, "Microencapsulation of Probiotics by Calcium Alginate-gelatinized Starch with Chitosan Coating and Evaluation of Survival in Simulated Human Gastro-intestinal Condition", *Iranian Journal of Pharmaceutical Research* (2014, 13 (3): 843-852.

\* cited by examiner

*Primary Examiner* — Sin J Lee
(74) *Attorney, Agent, or Firm* — Jed C. Benson

(57) ABSTRACT

The present invention relates to a new delivery system for PUFAs.

11 Claims, No Drawings

DELIVERY SYSTEM FOR POLYUNSATURATED FATTY ACIDS

This application is the U.S. national phase of International Application No. PCT/EP2020/060164 filed Apr. 9, 2020 which designated the U.S. and claims priority to EP patent application Ser. No. 19/171,756.0 filed Apr. 30, 2019, the entire contents of each of which are hereby incorporated by reference.

The present invention relates to a new delivery system of polyunsaturated fatty acids (PUFAs or Nutritional Lipids) for the large intestine. These nutritional ingredients are useful for gut and metabolic health in monogastric animals (such as swine and poultry as well as fish), especially in humans.

During the last few years, an increase in consumer interest in products that promote gut health could be observed. Many new products came on the market and where accepted widely by the consumers.

There has also been increased investigation into the potential effects of gut microbiota on metabolism and immunity, as well as obesity, inflammation, cardiovascular disease and diabetes.

It is known, that PUFAs are important and healthy compound.

PUFAs are commonly used as oils or formulated as powderous particles or granules, wherein the PUFAs are embedded within an encapsulating matrix material. Usually the matrix materials are readily dissolved in the stomach, immediately releasing the vitamin. Therefore, the PUFAs will be absorbed in the stomach or small intestine and not reach the large intestine.

Release in the small or large intestine is usually achieved with controlled release capsules or tablets. The active substances are incorporated in a capsule or tablet that is coated with one or more coatings that lead to controlled release. However, tablets and capsules as delivery system have several drawbacks. The amount of active that can be incorporated in a single tablet or capsule limited by the available volume. Especially very young and elderly patients have difficulties with swallowing tablets or capsules. Gelatine capsules are a common dosage form of PUFAs, but these capsules release the oil in the stomach already. In tablets, the oil will be squeezed out of the encapsulating matrix during tablet compression. Residence time of capsules and tablets in the stomach is very variable and premature release may occur.

Multiparticulate forms like powders, granules, beadlets or pellets overcome these drawbacks. However, application of controlled release coatings on multiparticulate dosage forms is difficult due to the larger specific surfaces as compared to tablets or capsules. To achieve an evenly distributed coating layer with sufficient thickness, the required amount of coating material is much higher than for tablets or capsules, reducing the available space for payload.

Suitable coating materials for release in the small intestine often comprise pH sensitive polymers. This approach utilizes the existence of the pH gradient in the GIT that increases progressively from the stomach (pH 1.5-3.5) and small intestine (pH 5.5-6.8) to the large intestine (6.4-7.0). The most commonly used pH-dependent polymers are derivatives of acrylic acid and cellulose. Various pH-dependent coating polymers include cellulose acetate phthalate (CAP) (Aquateric®), poly vinyl acetate phthalate(PVAP) (Coateric®), hydroxypropyl methyl cellulose phthalate (HPMCP), and methacrylic acid copolymers, commonly known as methacrylate copolymers or Eudragit.

An important limitation of the pH sensitive coating technique is the uncertainty of the location and environment in which the coating may start to dissolve. It is possible that enteric coating alone may lead to premature drug release in the small intestine due to a variation in GI motility.

The use of GI microflora as a mechanism of drug release in the colonic region has been of great interest to researchers in the past. The majority of bacteria are present in the distal gut although they are distributed throughout the GI tract. The colonic bacteria are predominately anaerobic in nature and secrete enzymes that are capable of metabolizing both endogenous and exogenous substrates such as carbohydrates and proteins that escape digestion in the upper GI tract. Polysaccharides naturally occurring in plant (e.g., pectin, guar gum, inulin), animal (e.g., chitosan, chondroitin sulfate), algal (e.g., alginates), or microbial (e.g., dextran) origins were studied for colon targeting. These are broken down by the colonic microflora to simple saccharides by saccharolytic species like bacteroides and bifidobacteria. [Jose, S., K. Dhanya, T. A. Cinu, J. Litty and A. J. Chacko (2009). "Colon targeted drug delivery: different approaches." J. Young Pharm. 1(1): 13-19.].

Although specifically degraded in the large intestine, many of these polymers are hydrophilic in nature, and swell under exposure to upper GI conditions, which leads to premature drug release. Moreover, these fermentable usually show very high viscosity in solution, which makes them difficult or impossible to process in higher concentration.

Fermentable biopolymers have been used as encapsulating matrix. In matrix encapsulation, the active substance is homogenously distributed in a protective matrix, in this case a fermentable biopolymer. However, matrix encapsulation has several serious drawbacks. Due to the high viscosity of the biopolymers, the matrix solution, e.g. in a spray drying or gel encapsulation is very dilute, making it difficult and expensive to dry. Payload in matrix encapsulation is relatively low (typically less than 50%).

Now the goal of the present invention was to find an improved multiparticulate delivery system (formulation) to improve the stability of PUFAs during the transport through the stomach and the small intestine (before being released in the large intestine) so that the availability and the efficacy of the PUFAs are improved.

Furthermore, the new delivery system should be producible in a simple and industrial applicable way.

It was found that when a solid core comprising at least one PUFA is coated with a specific inner and a specific outer coating, then the delivery system has improved properties. Furthermore, the delivery system can be produced in batchwise as well as in by continuous process.

The new delivery system (DS) according to the present invention consists of
(a) a solid core, which comprises at one PUFA, and
(b) an inner coating comprising at least one fermentable biopolymer, which is crosslinked, and
(c) an outer coating which is resistant to stomach conditions and releasing in the small intestine.

In the context of the present invention, the term "PUFA" (polyunsaturated fatty acid) is used in its generally accepted meaning; it relates to fatty acids with at least 2 carbon-carbon double bonds (preferably 2 to 6, more preferably 4 or 5 or 6 carbon-carbon double bonds), preferably consisting of 16-24 carbon atoms (preferably 18-22 carbon atoms), and comprise n-3, n-6 and n-9 acids. Although the term PUFA defines free acids, it is generally understood to also mean their salts and these acids in the form of their naturally occurring esters, i.e. as glycerides (comprising mono-, diand triglycerides) and in form of esters into which they are converted, e.g. by transesterification, such as ethyl esters. PUFAs of preferred interest in the context of the present invention are n-3 and n-6 PUFAs, especially EPA (eicosapenta-5,8,11,14,17-enoic acid), DPA (docosapentaenoic acid), DHA (docosahexa-4,7,10,13,16,19-enoic acid), GLA (gamma-linolenic acid) and ARA (arachidonic acid), preferably of food-grade quality, as single compounds or in mixtures, preferably in the form of their esters, e.g., triglycerides, or ethyl esters, especially as components of oils obtained from marine animals, preferably from fish, from plants or by fermentation.

Well-known polyunsaturated fatty acids are docosahexaenoic acid (DHA), eicosapentae-noic acid (EPA) and arachidonic acid (ARA).

If needed and wished, other nutraceuticals can be incorporated into the core (or the coatings. Nutraceuticals are compounds that provide health benefits in the animal.

Therefore, the present invention relates to a delivery system (DS1), which is the delivery system (DS), wherein the at least one PUFA is chosen from the group consisting of docosahexaenoic acid (DHA), eicosapentaenoic acid (EPA) and arachidonic acid (ARA).

The delivery system according to the present invention comprises an inner coating, which needs to fulfill the criteria as defined. Suitable materials for the inner coating (fermentable biopolymer) are for example alginate, chitosan, pectin, cyclodextrin as well as other gums. Preferred coating materials for the inner coating are alginate or pectin.

The inner coating is crosslinked. This can be done by commonly known crosslinking compounds. In case alginate is used that can be done by Zn, Mg and/or Ca ions (by the use of a salt). The crosslinker can be sprayed onto the solid core after having applied the inner coating or simultaneously. Or the coated particles can be dipped into a solution comprising the crosslinker.

Preferably the crosslinker is sprayed onto the particles after having applied the inner coating layer.

Another advantage of the present invention also lies therein that the production of the new delivery system according to the present invention can be done batch-wise as well as continuously. In contrast to the systems known from the prior art this is a huge advantage also in view of the industrial production of such product. The details of the process are disclosed below.

Therefore, the present invention relates to a delivery system (DS2), which is the delivery system (DS) or (DS1), wherein the material of the inner coating is chosen from group consisting of alginate, chitosan, pectin, cyclodextrin as well as other gums.

Therefore, the present invention relates to a delivery system (DS2'), which is the delivery system (DS2), wherein the material of the inner coating is alginate or pectin.

The inner coating layer is covering the core (more or less) completely. Ideally the (layer of the inner coating has (more or less) the same thickness when applied on the solid core. Usually the thickness of the inner coating layer is at least 5 µm and not more than 20 µm. Preferably, the thickness of the inner coating layer is between 5 µm-10 µm.

Therefore, the present invention relates to a delivery system (DS3), which is the delivery system (DS), (DS1), (DS2) or (DS2'), wherein the thickness of the inner coating layer is 5 µm-10 µm.

The inner coating layer is crosslinked with at least one crosslinking agent. Any suitable crosslinker can be used. Very suitable (and therefore preferred are Zn, Mg and Ca ions (they are added in form of a salt).

Therefore, the present invention relates to a delivery system (DS4), which is the delivery system (DS), (DS1), (DS2), (DS2') or (DS3), wherein the inner coating layer is crosslinked with at least one crosslinking agent (preferably with Zn, Mg and/or Ca ions).

Therefore, the present invention relates to a delivery system (DS5), which is the delivery system (DS), (DS1), (DS2), (DS2'), (DS3) or (DS4), wherein the crosslinked inner coating layer is Na alginate or pectin.

The delivery system according to the present invention comprises an outer coating, which needs to fulfill the criteria as defined. Suitable materials which fulfill the criteria for the outer coating is for example shellac, methacrylate copolymers and fats.

Therefore, the present invention relates to a delivery system (DS6), which is the delivery system (DS), (DS1), (DS2), (DS2'), (DS3), (DS4) or (DS5), wherein the material of the outer coating is chosen from group consisting of shellac, methacrylate copolymers and fats.

The outer coating layer is covering the inner coating (more or less) completely. Ideally the layer of the outer coating has (more or less) the same thickness when applied on the inner coating.

Usually the thickness of the outer layer is at least 10 µm and usually less than 30 µm. Preferably, the thickness of the outer coating layer is between 10 and 20 µm.

Therefore, the present invention relates to a delivery system (DS7), which is the delivery system (DS), (DS1), (DS2), (DS2'), (DS3), (DS4), (DS5) or (DS6), wherein the thickness of the outer coating layer is 10 µm-20 µm.

The solid core of the delivery system according to the present invention is usually 10-85 wt-%, preferably 50-75 wt-%, based on the total weight of the delivery system.

Therefore, the present invention relates to a delivery system (DS8), which is the delivery system (DS), (DS1), (DS2), (DS2'), (DS3), (DS4), (DS5), (DS6) or (DS7), wherein the solid core of the delivery system is 10-85 wt-%, preferably 50-75 wt-%, based on the total weight of the delivery system.

The inner coating of the delivery system according to the present invention is usually 1-20 wt-%, preferably 1-10 wt-%, based on the total weight of the delivery system.

Therefore, the present invention relates to a delivery system (DS9), which is the delivery system (DS), (DS1), (DS2), (DS2'), (DS3), (DS4), (DS5), (DS6), (DS7) or (DS8), wherein the inner coating of the delivery system is 10-85 wt-%, preferably 1-10 wt-%, based on the total weight of the delivery system.

The outer coating of the delivery system according to the present invention is usually 1-30 wt-%, preferably 15-30 wt-%, based on the total weight of the delivery system.

Therefore, the present invention relates to a delivery system (DS10), which is the delivery system (DS), (DS1), (DS2), (DS2'), (DS3), (DS4), (DS5), (DS6), (DS7), (DS8) or (DS9), wherein the outer coating of the delivery system is 1-30 wt-%, preferably 15-30 wt-%, based on the total weight of the delivery system The delivery system according to the present invention can be up to 2 mm in size. The size is defined by the longest diameter of the particle. The shape of the particle is not an essential feature of the present invention. Also, the size distribution of the particles is not essential. The size and the shape of the particle is mainly defined by the solid core of the delivery system. Depending on the use of the delivery system the size can be adjusted.

The delivery system according to the present invention is produced by commonly known technology.

Usually the solid core is produced in a first step and then the inner and outer coatings are applied.

The solid core particles can be produced by known methods, such as spray-drying, agglomeration, granulation, micro-tableting, extrusion or extrusion-spheronization.

As disclosed above one of the major advantages of the new delivery system (besides the property of the delivery system) lies in the process of production of the delivery system.

The new delivery system can be produced batch-wise of continuously.

When produced batch-wise the new particles can be produced as follows:

In a first step the solid cores are coated by spray coating with the coating material of the inner coating, and then the crosslinker is sprayed onto the particle. In a second step the outer coating is sprayed onto the particle obtained by the previous steps and finally the particles are dried.

The advantage of the process is that the steps, including the generation of solid cores by granulation or agglomeration, can be carried out in the same apparatus (fluid-bed processor) which reduces the technical effort. Nevertheless, it is also possible to i.e. produce the solid cores first, store them and then coat them.

Another option how to produce the new delivery system is a continuous process, wherein the solid cores are produced first and then the coating steps are done spray onto the particle one after the other. These processes are ideal to apply in an industrial scale.

Therefore, the present invention also related to a process of production (P) of any of the particles (DS), (DS1), (DS2), (DS2'), (DS3), (DS4), (DS5), (DS6), (DS7), (DS8), (DS9) or (DS10), wherein the process is carried out batch-wise.

Therefore, the present invention also related to a process of production (P1) of any of the particles (DS), (DS1), (DS2), (DS2'), (DS3), (DS4), (SD5), (DS6), (DS7), (DS8), (DS9) or (DS10), wherein the process is carried out continuously.

The new delivery systems (DS), (DS1), (DS2), (DS2'), (DS3), (DS4), (DS5), (DS6), (DS7), (DS8), (DS9) and/or (DS10) according to the present invention can be used as such or incorporated into application forms.

The new delivery systems (DS), (DS1), (DS2), (DS2'), (DS3), (DS4), (DS5), (DS6), (DS7), (DS8), (DS9) and/or (DS10) can used as such in any dietary supplement, food product, feed product, personal care product or pharmaceutical product.

The new delivery systems (DS), (DS1), (DS2), (DS2'), (DS3), (DS4), (DS5), (DS6), (DS7), (DS8), (DS9) or (DS10) can also be part of a premix formulation, which can then be used to formulate any dietary supplement, food product, feed product, personal care product or pharmaceutical product.

The invention also relates to a process for the production of a premix, dietary supplement, food product, feed product, personal care product or pharmaceutical product using at least one delivery system (DS), (DS1), (DS2), (DS2'), (DS3), (DS4), (DS5), (DS6), (DS7), (DS8), (DS9) or (DS10).

The invention also relates to a premix, dietary supplement, food product, feed product, personal care product or pharmaceutical product comprising at least one delivery system (DS), (DS1), (DS2), (DS2'), (DS3), (DS4), (DS5), (DS6), (DS7), (DS8), (DS9) or (DS10).

The following examples serve to illustrate specific embodiments of the invention claimed herein. All percentages are given in relation to the weight and all the temperatures are given in degree Celsius.

EXAMPLES

Example 1

15 g Na-alginate (grinsted sodium alginate) is dissolved in 485 g water at 60° C. with stirring. 31.5 g Ca chloride dihydrate is dissolved in 98.5 g water. 100 g PUFA powder (MEG-3 30% Powder, containing 180 mg/g of powder as triglyceride in a matrix of gelatine) is filled in a fluid-bed processor (WFP mini, DMR, Wurster configuration). All coating steps are performed at a product temperature between 50 and 60° C. The alginate solution is sprayed on the fluidized PUFA powder first. After spraying of the alginate solution, the feeding tube is briefly rinsed with water. The Ca chloride solution is sprayed on the inner coating at 53° C. product temperature for hardening. After the hardening solution, 154 g aqueous shellac preparation with a solids content of 25% (SSB Aquagold, Stroever) is sprayed as outer coating. After spraying of the shellac, the product is dried in the fluid bed.

Composition of the final coated granulate is 65% Core material (=ca 12% PUFA), 9% alginate, 1% Ca chloride and 25% shellac.

The invention claimed is:

1. A delivery system consisting of:
   (a) a solid core which comprises at least one polyunsaturated fatty acid (PUFA),
   (b) an inner coating covering the solid core, wherein the inner coating is formed of at least one crosslinked fermentable biopolymer selected from the group consisting of crosslinked alginate and crosslinked pectin, and
   (c) an outer coating covering the inner coating, wherein the outer coating is resistant to stomach conditions and release of the at least one PUFA in the small intestine and is formed of a material selected from the group consisting of shellac, methacrylate copolymers and fats.

2. The delivery system according to claim 1, wherein the at least one PUFA is selected from the group consisting of docosahexaenoic acid (DHA), eicosapentaenoic acid (EPA) and arachidonic acid (ARA).

3. The delivery system according to claim 1, wherein the at least one crosslinked fermentable biopolymer forming the inner coating is crosslinked with Zn, Mg and/or Ca ions.

4. The delivery system according to claim 1, wherein the solid core is present in an amount of 10-85 wt. %, based on total weight of the delivery system.

5. The delivery system according to claim 1, wherein the inner coating is present in an amount of 1-20 wt. %, based on total weight of the delivery system.

6. The delivery system according to claim 1, wherein the outer coating is present in an amount of 1-30 wt. %, based on total weight of the delivery system.

7. A process for the production of a product selected from the group consisting of premix products, dietary supplement products, food products, feed products, personal care products and pharmaceutical products, wherein the process comprises incorporating in the product the delivery system according to claim 1.

8. A product which comprises the delivery system according to claim 1, wherein the product is selected from the group consisting of premix products, dietary supplement products, food products, feed products, personal care products and pharmaceutical products.

9. A process for producing the delivery system according to claim 1, wherein the process comprises the steps of:
(a) providing the solid core which comprises at least one PUFA;
(b) coating the solid core with at least one fermentable biopolymer selected from the group consisting of alginate and pectin, and crosslinking the at least one fermentable biopolymer to form the inner coating; and thereafter
(c) coating a material selected from the group consisting of shellac, methacrylate copolymers and fats onto the inner coating to thereby form the outer coating which is resistant to stomach conditions and release of the at least one PUFA in the small intestine.

10. The process according to claim 9, wherein the process is carried out batchwise.

11. The process according to claim 9, wherein the process is carried out continuously.

* * * * *